United States Patent
Suzuki et al.

(10) Patent No.: US 9,669,549 B2
(45) Date of Patent: Jun. 6, 2017

(54) MOTION SETTING METHOD

(71) Applicant: FUJI MACHINE MFG. CO., LTD., Chiryu (JP)

(72) Inventors: Jun Suzuki, Chiryu (JP); Nobuyuki Nakane, Chiryu (JP); Joji Isozumi, Chiryu (JP); Hideaki Nomura, Chiryu (JP); Satoshi Shimizu, Nagoya (JP); Takahiko Yamamoto, Chiryu (JP)

(73) Assignee: FUJI MACHINE MFG. CO., LTD., Chiryu (JP)

( * ) Notice: Subject to any disclaimer, the term of this patent is extended or adjusted under 35 U.S.C. 154(b) by 67 days.

(21) Appl. No.: 14/377,592

(22) PCT Filed: Jan. 30, 2013

(86) PCT No.: PCT/JP2013/052095
§ 371 (c)(1),
(2) Date: Aug. 8, 2014

(87) PCT Pub. No.: WO2013/118623
PCT Pub. Date: Aug. 15, 2013

(65) Prior Publication Data
US 2015/0005938 A1    Jan. 1, 2015

(30) Foreign Application Priority Data

Feb. 10, 2012 (JP) ................................ 2012-027580

(51) Int. Cl.
G05B 19/04 (2006.01)
G05B 19/18 (2006.01)
(Continued)

(52) U.S. Cl.
CPC ............... B25J 11/009 (2013.01); A61G 5/14 (2013.01); A61G 7/1017 (2013.01); A61G 7/1046 (2013.01); B25J 9/1664 (2013.01)

(58) Field of Classification Search
CPC ... B25J 11/009; B25J 9/1664; A61G 2200/52; A61G 5/068; A61G 7/1017;
(Continued)

(56) References Cited

U.S. PATENT DOCUMENTS 4,555,139 A * 11/1985 Leib ....................... A47C 3/023
                                                          297/285
4,595,235 A *  6/1986 Leib ......................... A47C 3/02
                                                          297/285
(Continued)

FOREIGN PATENT DOCUMENTS

JP       2005348761 A  * 12/2005
JP       2007-195814      8/2007
(Continued)

OTHER PUBLICATIONS

"Uncontrolled manifold analysis of standing-up motion for development of an assistance system" Qi An; Hajime Asama; Cara E. Stepp; Yoky Matsuoka 2011 IEEE International Conference on Rehabilitation Robotics, Year: 2011; pp. 1-5, DOI: 10.1109/ICORR. 2011.5975447.*

(Continued)

*Primary Examiner* — Khoi Tran
*Assistant Examiner* — Jorge Peche
(74) *Attorney, Agent, or Firm* — Oblon, McClelland, Maier & Neustadt, L.L.P.

(57) ABSTRACT

A motion setting method that can set motions to a standing and sitting motion-supporting robot so that a care receiver can make standing and sitting motions comfortably is provided. The motion setting method is a motion setting method of a standing and sitting motion-supporting robot that supports standing and sitting motions being at least one of a standing motion and a sitting motion of a care receive. The motion setting method includes a custom tracking path (Continued)

acquisition step. In the custom tracking path acquisition step, a custom tracking path is obtained by correcting a base tracking path of the standing and sitting motions in accordance with the position of a predetermined body portion of each care receiver.

9 Claims, 9 Drawing Sheets (51) Int. Cl.
*B25J 11/00* (2006.01)
*A61G 7/10* (2006.01)
*B25J 9/16* (2006.01)
*A61G 5/14* (2006.01)

(58) Field of Classification Search
CPC .. A61G 7/1019; A61G 7/1046; A61G 7/1048; A61G 5/00; A61G 5/14; A61G 7/10; A61H 2003/043; A61H 3/008; A61H 3/04; A61H 2201/16
USPC .... 700/253, 250, 254, 260, 262, 275; 901/8, 901/14, 19
See application file for complete search history.

(56) References Cited

U.S. PATENT DOCUMENTS

| | | | | |
|---|---|---|---|---|
| 5,255,957 | A * | 10/1993 | Opsvik | A47C 9/005 297/423.12 |
| 6,449,783 | B1 * | 9/2002 | Moser | A47K 13/10 4/254 |
| 6,742,206 | B1 * | 6/2004 | Han | A61G 5/006 280/250.1 |
| 8,777,238 | B1 * | 7/2014 | Blackwood | A61G 7/1011 280/47.25 |
| 2005/0216124 | A1 * | 9/2005 | Suzuki | G05D 1/027 700/253 |
| 2006/0079817 | A1 * | 4/2006 | Dewald | A61H 1/02 601/5 |
| 2006/0151218 | A1 * | 7/2006 | Goren | A61G 5/061 180/24.02 |
| 2006/0229170 | A1 * | 10/2006 | Ozawa | A61H 1/003 482/92 |
| 2006/0273541 | A1 * | 12/2006 | Norman | A61G 5/1072 280/250.1 |
| 2011/0056019 | A1 * | 3/2011 | Altena | A61G 5/14 5/87.1 |
| 2011/0140492 | A1 * | 6/2011 | Walsh | A47C 3/021 297/271.6 |
| 2011/0238217 | A1 * | 9/2011 | Kume | A61G 7/1017 700/275 |
| 2011/0285186 | A1 * | 11/2011 | Demmelmeier | B60N 2/0248 297/217.1 |
| 2012/0253242 | A1 * | 10/2012 | Lee | A61G 7/1015 601/35 |
| 2013/0237884 | A1 * | 9/2013 | Kazerooni | A61H 3/00 601/34 |
| 2014/0100491 | A1 * | 4/2014 | Hu | A61H 3/008 601/27 |
| 2014/0259420 | A1 * | 9/2014 | Lambarth | A61G 7/015 5/618 |
| 2014/0265181 | A1 * | 9/2014 | Lambarth | A61G 1/017 280/28.5 |
| 2014/0265497 | A1 * | 9/2014 | Hough | A61G 5/14 297/316 |
| 2014/0319895 | A1 * | 10/2014 | Lange-Mao | B60N 2/002 297/463.1 |
| 2015/0012111 | A1 * | 1/2015 | Contreras-Vidal | A61B 5/4851 623/25 |
| 2015/0199892 | A1 * | 7/2015 | Johnson | G08B 21/0476 348/77 |
| 2015/0231947 | A1 * | 8/2015 | Shmueli-Friedland | B60H 1/00742 165/202 |
| 2015/0366546 | A1 * | 12/2015 | Kamen | A61B 5/067 600/461 |
| 2016/0199238 | A1 * | 7/2016 | Yamada | A47C 7/56 700/258 |
| 2016/0236591 | A1 * | 8/2016 | Lange-Mao | B60N 2/002 |

FOREIGN PATENT DOCUMENTS

| | | | | |
|---|---|---|---|---|
| JP | 2007-195814 | A | | 8/2007 |
| JP | 2008-080431 | | | 4/2008 |
| JP | 2010-142562 | | | 7/2010 |
| JP | 2010-142562 | A | | 7/2010 |
| JP | 2010142562 | A | * | 7/2010 |
| JP | 3166214 | | | 2/2011 |
| JP | 3166214 | U | * | 2/2011 |
| JP | WO 2013118623 | A1 | * | 8/2013 ........... A61G 7/1017 |
| JP | WO 2014122752 | A1 | * | 8/2014 ........... A61G 7/1019 |
| JP | WO 2014192085 | A1 | * | 12/2014 ............ A61G 5/14 |
| JP | WO 2015011837 | A1 | * | 1/2015 ............. A61H 3/008 |
| JP | WO 2015011839 | A1 | * | 1/2015 ........... A61G 7/1019 |
| JP | WO 2015045010 | A1 | * | 4/2015 .............. A61G 7/10 |
| WO | 2010/027015 | | | 3/2010 |

OTHER PUBLICATIONS

"Standing-up motion support for paraplegic patient with Robot Suit HAL;" Atsushi Tsukahara; Yasuhisa Hasegawa; Yoshiyuki Sankai; 2009 IEEE International Conference on Rehabilitation Robotics; Year: 2009; pp. 211-217, DOI: 10.1109/ICORR.2009.5209567.*
U.S. Appl. No. 14/766,633, filed Aug. 7, 2015, Isozumi, et al.
International Search Report issued May 7, 2013 in PCT/JP13/052095 filed Jan. 30, 2013.

* cited by examiner

MOTION SETTING METHOD

TECHNICAL FIELD

The present disclosure relates to a motion setting method of a standing and sitting motion-supporting robot that supports a standing motion or a sitting motion of a care receiver.

BACKGROUND ART

PTL 1 discloses a training assistance robot for standing and sitting motions. According to PTL 1, a plurality of patterns of a tracking path of a support unit that supports the armpit of a care receiver are stored in a control unit of the training assistance robot. The respective tracking paths are obtained by making a plurality of people with different heights, ages, and sexes perform the standing and sitting motions and tracing tracking paths thereof. That is, the respective tracking paths are raw data.

PTL 2 discloses a robot system that performs body motions. According to PTL 2, a robot can reproduce the motions of a subject (human or the like) which are measured through motion capturing in advance. Even with the case of PTL 2, the tracking path of the robot is measured through motion capturing. That is, the tracking path is raw data.

CITATION LIST

Patent Literature

PTL 1: Japanese Registered Utility Model No. 3166214
PTL 2: JP-A-2008-80431

SUMMARY OF INVENTION

Technical Problem

In this manner, according to the training assistance robot of PTL 1 and the robot system of PTL 2, the tracking path of the robot is raw data. For this reason, even when the number of tracking paths is small, a case where it is impossible to sufficiently respond to the motions of a care receiver using any tracking path may occur. That is, a case where a care receiver is not suitable to any tracking path may occur. Accordingly, the teachings of the background art lack versatility.

The posture of the care receiver changes successively when performing the standing motion and the sitting motion. For this reason, while supporting the standing motion and the sitting motion, it is necessary to move the robot so as not to interfere with changes in natural postures of the care receiver, in other words, to make the care receiver comfortable. However, there is no disclosure relating to the posture of the care receiver in PTL 1 and PTL 2.

The motion setting method of the present disclosure is made in consideration of these problems. An object of the present disclosure is to provide a motion setting method that can set motions to a standing and sitting motion-supporting robot so that a care receiver can make standing and sitting motions comfortably.

Solution to Problem

In order to solve the above-described problems, the motion setting method of the present disclosure relates to a motion setting method of a standing and sitting motion-supporting robot that supports standing and sitting motions being at least one of a standing motion and a sitting motion of a care receiver. The method includes a custom tracking path acquisition step of obtaining a custom tracking path by correcting a base tracking path of the standing and sitting motions in accordance with the position of a predetermined body portion of each care receiver.

According to the motion setting method of the present disclosure, it is possible to obtain the custom tracking paths by correcting the base tracking path. The correction is performed for every care receiver. For this reason, the movement of a care receiver tends to fit in the custom tracking paths. In addition, the correction is performed in accordance with the position of the body portion of the care receiver. For this reason, it is possible to move the standing and sitting motion-supporting robot so as not to interfere with changes in natural postures of the care receiver, in other words, to make the care receiver comfortable.

Preferably, the method may include a base tracking path acquisition step of obtaining the base tracking path before the custom tracking path acquisition step; to obtain the custom tracking paths of a predetermined body portion while performing the standing and sitting motions by correcting the base tracking path using the height of the care receiver in the custom tracking path acquisition step; and to set the chest angles of the care receiver in accordance with the position of the predetermined body portion in the custom tracking paths using the height of the care receiver.

According to the present configuration, the base tracking path is corrected in accordance with the height of the care receiver to obtain the custom tracking paths. For this reason, it is possible to set the custom tracking paths in accordance with the physique of the care receiver. In addition, according to the present configuration, the chest angles of the care receiver in the custom tracking paths are set in accordance with the height of the care receiver. For this reason, the care receiver feels comfortable. In addition, according to the present configuration, it is possible to perform the setting of the custom tracking paths and the setting of the chest angles using the height of the care receiver. For this reason, it is possible to simply set the custom tracking paths and the chest angles in accordance with the physique of the care receiver.

Preferably, when the base tracking path corresponds to the sitting motion of the care receiver, the custom tracking path acquisition step may be such that the correction, which is performed while obtaining the custom tracking paths from the base tracking path, is performed using the height of the care receiver and the height of the object used for sitting on.

During the sitting motion, the care receiver finally sits on the object used for sitting on. According to the present configuration, it is possible to set the custom tracking path by adding the height of the object used for sitting on to the point that corresponds to the end point of the custom tracking path.

Preferably, in the custom tracking path acquisition step, the correction, which is performed while obtaining the custom tracking path from the base tracking path, may include at least one of expanding, contracting, and offsetting of the base tracking path. According to the present configuration, it is possible to simply calculate the custom tracking path from the base tracking path.

Preferably, the base tracking path may be obtained through motion capturing. According to the present configuration, it is possible to simply obtain the base tracking path.

Preferably, the base tracking path may be obtained by sampling the standing and sitting motions of a healthy person. According to the present configuration, it is possible to obtain the base tracking path without making the care receiver, who already has difficulty in performing standing and sitting motions, perform the standing and sitting motions.

Preferably, the predetermined body portion may be at least one of the head, the shoulder, the chest, and the legs of the care receiver. According to the present configuration, it is possible to set the custom tracking path with respect to a body portion for which it is easy to find characteristics of movement while the care receiver performs the standing and sitting motions. For this reason, the movement of a care receiver tends to fit in the custom tracking paths.

Advantageous Effects of Invention

According to the present invention, it is possible to provide the motion setting method that can set motions to a standing and sitting motion-supporting robot so that the care receiver can make the standing and sitting motions comfortably.

REFERENCE SIGNS LIST

1: motion-supporting robot, 2: robot main body, 3: manual pulse generator, 4: control box
20: base, 21: first arm, 22: second arm, 23: support portion, 24: servo system, 40: input device, 41: computer, 42: input and output interface, 43: motion controller, 90: chair (object used for sitting on), 91: marker
200: base main body, 201: stopper, 202: wheel, 203: proximity sensor, 204: swinging shaft, 205: bearing block, 210: arm main body, 211: swinging shaft, 212: bearing block 220: arm main body, 221: swinging shaft, 230: support portion main body, 231: bracket, 232: handle, 240: servo motor, 241: servo amplifier, 242: encoder, 411: memory
H: height of chair, K: care receiver, L0: tracking path, L1: base tracking path, L2: custom tracking path, a1 to a5: coordinates, b1 to b5: coordinates, c1 to c5: coordinates, k: subject, θ: chest angle

DESCRIPTION OF EMBODIMENTS

Hereinafter, an embodiment of a motion setting method of the present disclosure will be described.

<Configuration of Standing and Sitting Motion-Supporting Robot>

Figure 1:
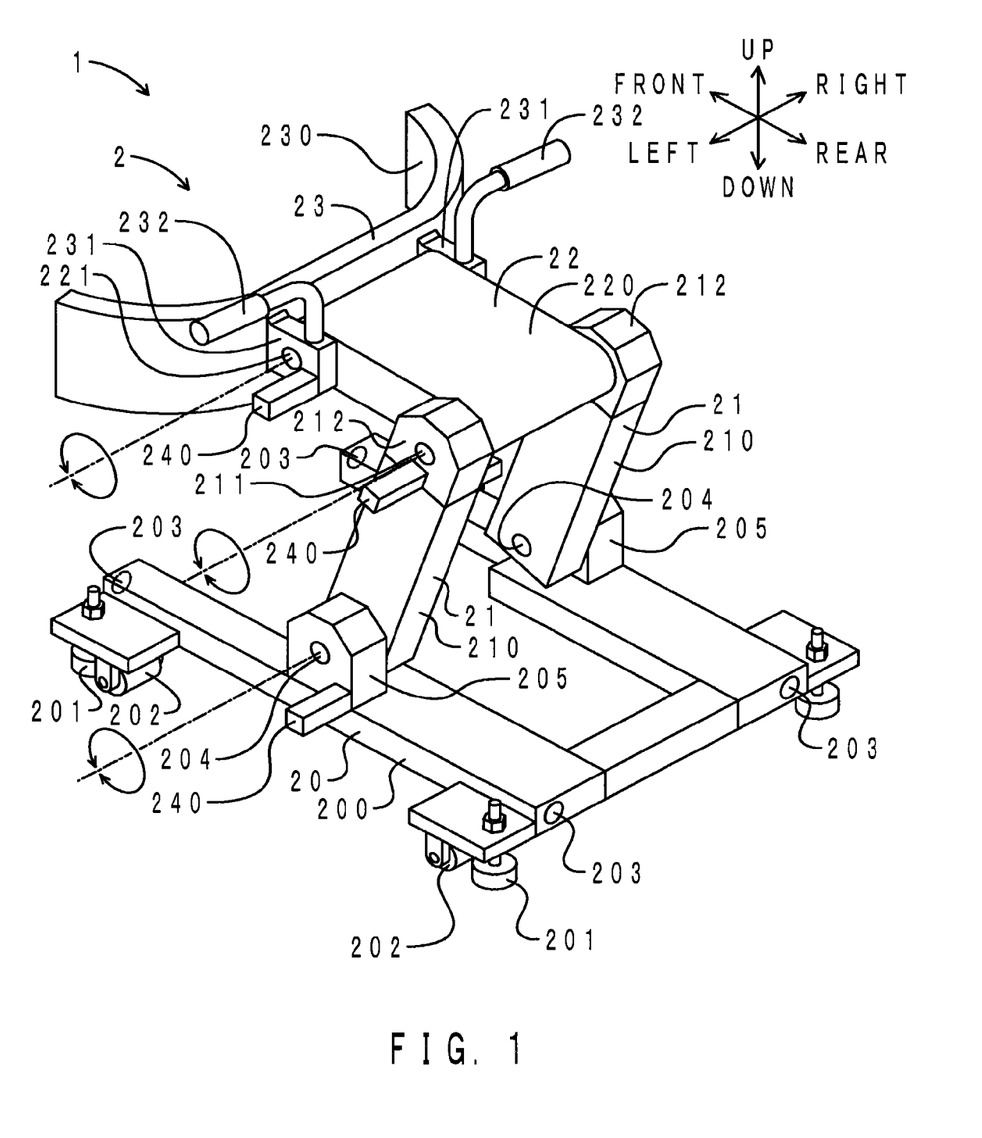
FIG. 1 is a perspective view of a robot main body of a standing and sitting motion-supporting robot to which motions are set through a motion setting method as an embodiment of a motion setting method of the present invention.
Figure 2:
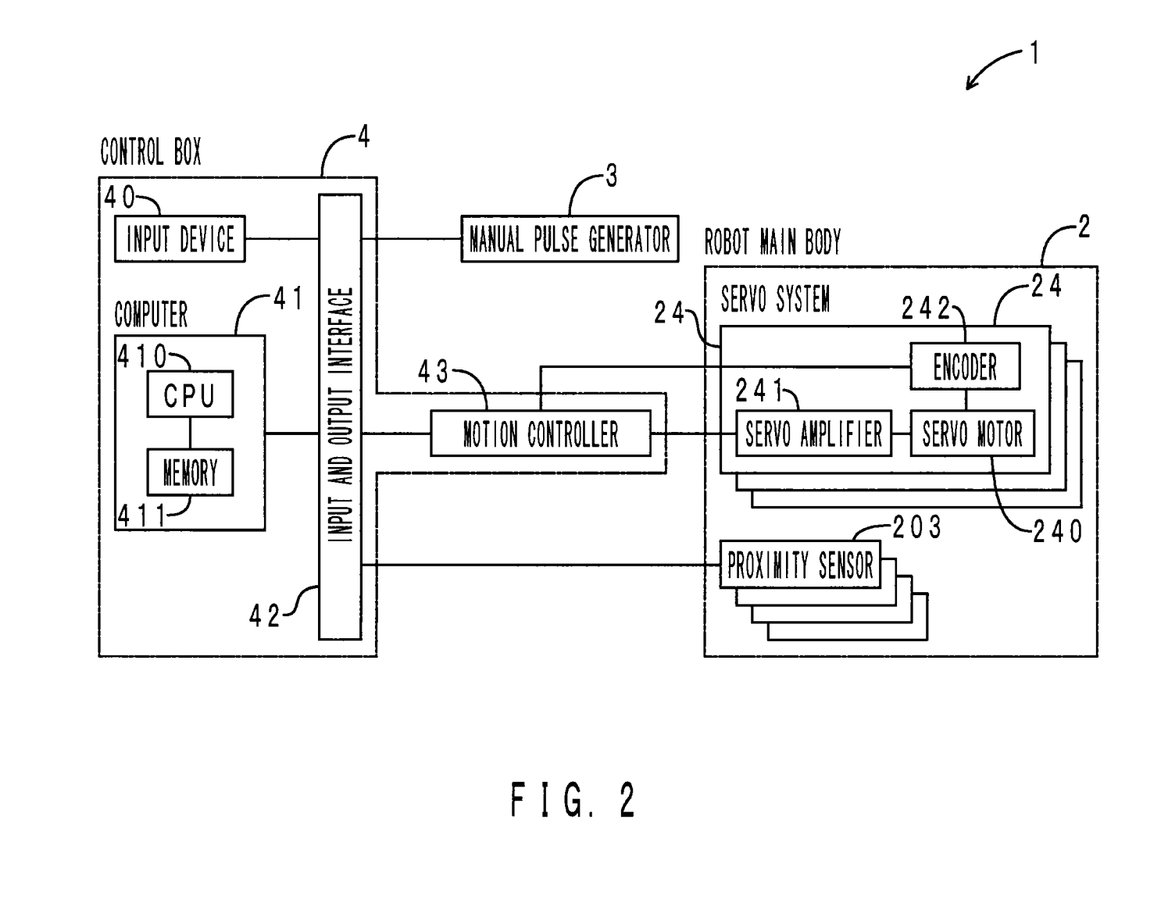
FIG. 2 is a block diagram of the standing and sitting motion-supporting robot.

First, a configuration of a standing and sitting motion-supporting robot to which motions are set through the motion setting method of the present embodiment will be described. FIG. 1 shows a perspective view of a robot main body of a standing and sitting motion-supporting robot to which motions are set through the motion setting method of the present embodiment. FIG. 2 shows a block diagram of the standing and sitting motion-supporting robot. As shown in FIGS. 1 and 2, the standing and sitting motion-supporting robot 1 includes a robot main body 2, a manual pulse generator 3, and a control box 4.

[Robot Main Body 2]

As shown in FIGS. 1 and 2, the robot main body 2 includes a base 20, a pair of right and left first arms 21, a second arm 22, a support portion 23, and three servo systems 24.

The base 20 includes a base main body 200, four stoppers 201, four wheels 202, four proximity sensors 203, a pair of right and left swinging shafts 204, and a pair of right and left bearing blocks 205.

The base main body 200 shows a C frame shape which opens frontward. A care receiver can insert his or her own feet into the frame of the base main body 200 through the opening. The four wheels 202 are disposed at four corners of the base main body 200. The robot main body 2 is movable by rotating the four wheels 202 on the floor. The four stoppers 201 are disposed at the four corners of the base main body 200. The four stoppers 201 are movable in a vertical direction. The robot main body 2 is fixed by bringing the four stoppers 201 into contact with the floor. The four stoppers 201 come into contact with the floor while supporting the standing and sitting motions of the care receiver. The four proximity sensors 203 are disposed at the four corners of the base main body 200. The four proximity sensors 203 monitor any obstacles around the robot main body 2 while supporting the standing and sitting motions of the care receiver.

The pair of right and left bearing blocks 205 is disposed near the center of both right and left edges of the base main body 200. The pair of right and left swinging shafts 204 is supported by the bearing blocks 205 so as to be rotatable in the longitudinal direction (a direction rotating in order of front side→upper side→rear side→lower side, or an opposite direction thereof). The pair of right and left swinging shafts 204 extends in the lateral direction (horizontal direction).

The pair of right and left first arms 21 includes arm main bodies 210, a swinging shaft 211, and bearing blocks 212. The swinging shafts 204 are attached to lower ends of the pair of right and left arm main bodies 210. The pair of right and left bearing blocks 212 is attached to upper ends of the arm main bodies 210. The swinging shaft 211 is supported by the pair of right and left bearing blocks 212 so as to be rotatable in the longitudinal direction. The swinging shaft 211 extends in the lateral direction.

The second arm 22 includes an arm main body 220 and a swinging shaft 221. The swinging shaft 211 is attached to a rear end of the arm main body 220. The swinging shaft 221 is attached to a front end of the arm main body 220. The swinging shaft 221 extends in the lateral direction.

The support portion 23 includes a support portion main body 230, a pair of brackets 231, and a pair of handles 232. The support portion main body 230 shows a C plate shape which opens frontward. A cushioning material (not shown) is disposed on the front surface of the support portion main body 230. The support portion main body 230 supports the chest of a care receiver while supporting the standing and sitting motions of the care receiver. The pair of brackets 231 is disposed on the rear surface of the support portion main body 230. The pair of brackets 231 supports both the right and left ends of the swinging shaft 221 so as to be movable in the longitudinal direction. The pair of handles 232 is provided so as to project upward from the brackets 231. The pair of handles 232 is held by the care receiver while supporting the standing and sitting motions of the care receiver.

The three servo systems 24 can rotate the swinging shafts 204, 211, and 221. As shown in FIG. 2, each of the three servo systems 24 has a servo motor 240, a servo amplifier 241, and an encoder 242. In addition, the three servo motors 240 are rigidly attached to the swinging shafts 204, 211, and 221. Alternatively, the three servo motors 240 are attached to arms (not shown) of the base 20. The arms are connected to the swinging shafts 204, 211, and 221 through gears which are driven by the servo motors 240 and attached to the swinging shafts 204, 211, and 221. Accordingly, it is possible to obtain advantageous dynamic inertia.

[Manual Pulse Generator 3]

The manual pulse generator 3 includes a changeover switch (not shown) and a dial (not shown). It is possible to switch the operation mode of the robot main body 2 between an automatic mode and a manual mode using the changeover switch.

In the automatic mode, a computer 41 of the control box 4 to be described below automatically drives the three servo motors 240 while maintaining the preset custom tracking paths, movement speed, and chest angle. That is, the computer 41 automatically moves the support portion 23.

In the manual mode, an operator drives the three servo motors 240 while maintaining the preset custom tracking paths and chest angle by rotating the dial. That is, the operator manually moves the support portion 23. It is possible to manually adjust the movement speed and the swing speed of the support portion 23 by the rotating speed of the dial.

[Control Box 4]

As shown in FIG. 2, the control box 4 includes an input device 40, a computer 41, an input and output interface 42, and a motion controller 43. The input and output interface 42 is electrically connected to the input device 40, the computer 41, the manual pulse generator 3, the motion controller 43, and the four proximity sensors 203.

The computer 41 includes a CPU (Central Processing Unit) 410 and a memory 411. The CPU 410 can calculate custom tracking paths of the shoulder of the care receiver, tracking paths of the support portion 23 corresponding to the custom tracking paths, the movement speed of the support portion 23, the swing angle of the support portion 23, the swing speed of the support portion 23, the required time of the custom tracking paths, the start point of the custom tracking paths, the end point of the custom tracking paths, and the like. The shoulder of the care receiver is included in the concept of a "predetermined body portion" of the disclosure.

The memory 411 stores a base tracking path of the shoulder of the care receiver, a chest angle estimation map, custom tracking paths of the shoulder, tracking paths of the support portion 23 corresponding to the custom tracking paths, chest angles in the positions of the custom tracking paths, and the like. The chest angle in the present embodiment is an inclination angle of the chest of the care receiver set to a Y axis by setting a horizontal axis (front and rear axis) as an X axis and a perpendicular axis (vertical axis) as the Y axis.

The input device 40 may be a touch panel. The operator can input the height of the care receiver and the height of the chair when the care receiver performs the sitting motion, to the computer 41 through the input device 40.

The motion controller 43 is electrically connected to the three servo systems 24. The motion controller 43 performs real time control of the three servo systems 24 so as to keep the tracking paths and chest angles stored in the memory 411.

The surrounding environment of the robot main body 2 is transmitted from the four proximity sensors 203 to the computer 41. The computer 41 can make the robot main body stop in an emergency when the proximity sensors 203 detect any obstacles that can interfere with the motion of the robot main body 2 while supporting the standing and sitting motions of the care receiver.

<Method of Estimating Chest Angles>

Next, a method of estimating chest angles which is used in the motion setting method of the present embodiment will be described. The shoulder of the care receiver moves in a predetermined tracking path while the standing and sitting motion-supporting robot 1 supports the standing and sitting motions of the care receiver. The angle of the chest, that is, the chest angle of the care receiver continuously changes while the shoulder moves in a predetermined tracking path.

For example, when the care receiver performs a standing motion, the care receiver first takes a sitting posture. For this reason, the chest angle (inclination angle of the chest relative to a Y axis (vertical axis)) is small. Next, the care receiver takes a forward inclination posture by moving the center of gravity forward. For this reason, the chest angle becomes large. Finally, the care receiver takes a standing posture. For this reason, the chest angle becomes small again. In this manner, the chest angle of the care receiver changes depending on each position of the tracking path of the shoulder.

Here, the chest of the care receiver is supported by the support portion 23 (in specific, support portion main body 230). For this reason, while supporting the standing and sitting motions of the care receiver, the care receiver feels comfortable if the angle of the support portion 23 is coincident with the chest angle of the care receiver (if the angle of the support portion changes following the natural movement of the chest of the care receiver).

However, it is necessary to make a care receiver, who already has difficulty in performing standing and sitting motions, perform the standing and sitting motions in order to accurately measure the chest angles of the care receiver in each position of the tracking path. In addition, it is complicated to perform the work of measuring the chest angles for every care receiver.

As a result of intensive studies from this point of view, the present inventor was successful in estimating the chest angles of the care receiver while performing the standing and sitting motions using coordinates (x (=X-axis direction position) and y (=Y-axis direction position)) of the shoulder of the care receiver with high accuracy. Furthermore, the present inventor was successful in estimating the chest angles of the care receiver while performing the standing and sitting motions using the coordinates of the shoulder of the care receiver and the height of the care receiver with extremely high accuracy.

Figure 3:
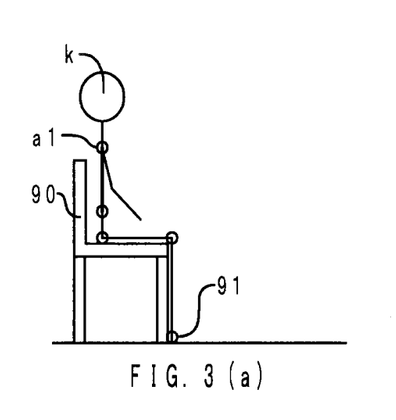
FIG. 3(a) is a schematic diagram of a subject in a sitting state.
FIG. 3(b) is a schematic diagram of a subject in a first standing state.
FIG. 3(c) is a schematic diagram of a subject in a second standing state.
FIG. 3(d) is a schematic diagram of a subject in a third standing state.
FIG. 3(e) is a schematic diagram of a subject in a standing-upright state.
FIG. 3(f) shows changes of chest angles and a tracking path of the shoulder in FIGS. 3(a) to 3(e).

Hereinafter, the results of the studies will be described. First, a subject (healthy person) is made to perform a standing motion which is measured through motion capturing. FIG. 3(a) shows a schematic diagram of the subject in a sitting state. FIG. 3(b) shows a schematic diagram of the subject in a first standing state. FIG. 3(c) shows a schematic diagram of the subject in a second standing state. FIG. 3(d) shows a schematic diagram of the subject in a third standing state. FIG. 3(e) shows a schematic diagram of the subject in a standing-upright state. FIG. 3(f) shows changes of chest angles and a tracking path of the shoulder in FIGS. 3(a) to 3(e).

For the measurements, first, the heels, the knees, the waist, the abdomen, and shoulder of a subject k are displayed with markers 91. Next, as shown in FIGS. 3(a) to 3(e), the subject k was made to perform the standing motion. At this time, the standing motion of the subject k was imaged using a camera. Then, as shown in FIG. 3(f), the changes of chest angles θ of the subject k and a tracking path L0 of the shoulder are calculated from the images obtained from the imaging.

The chest angle θ is an inclination angle of a straight line (which is shown by the heavy line in FIGS. 3(a) to 3(f)) that connects the marker 91 of the abdomen and the marker 91 of the shoulder to the Y axis. In addition, the tracking path L0 of the shoulder is a tracking path which is obtained by approximating coordinates a1 (x,y) to a5 (x,y) of the shoulder in each posture of the standing motion using a least square method (the number of the coordinates a1 to a5 is not limited). In addition, the number of samples of the standing motion is 1315 patterns.

Next, the inventor performed regression analysis on the 1315 patterns of the standing motion using spreadsheet software (Excel produced by Microsoft Corporation). Explanatory variables are coordinates a1 to a5 of the shoulder. Explained variables are chest angles θ. The result of the regression analysis is represented by Expression (1).

$$\theta = A \times x - B \times y + C \qquad \text{Expression (1)}$$

Here, A, B, and C in Expression (1) are positive numbers (fixed numbers). A, B, and C are affected by the number of the samplings, the coordinates a1 to a5 of the shoulder of the subject k, the standing motion of the subject k, and the like. During the regression analysis this time, as an example, A was 0.083953, B was 0.084588y, and C was 62.356075.

The suitability of the measured data (sampled standing motion) of Expression (1) was evaluated using adj R2 (which is a coefficient of determination adjusted for degree of freedom; as the coefficient becomes closer to 1, the suitability of Expression (1) with respect to the measured data becomes higher). Adj R2 of Expression (1) when A was 0.083953, B was 0.084588y, and C was 62.356075 was 0.92203. It was determined from the regression analysis that there is a high correlation between the chest angles θ and the coordinates a1 to a5 of the shoulder. That is, it was determined that it is possible to estimate the chest angles θ in the standing motion using the tracking path L0 of the shoulder of the subject k, with high accuracy.

Furthermore, the inventor found out that the error between Expression (1) and the measured data varies depending on the height of the subject k. Therefore, the height h of the subject k is further added to the explanatory variables. The result of the regression analysis is represented by Expression (2).

$$\theta = D \times x - E \times y + F \times h + G \qquad \text{Expression (2)}$$

Here, D, E, F, and G in Expression (2) are positive numbers (fixed numbers). D, E, F, and G are affected by the number of the samplings, the coordinates a1 to a5 of the shoulder of the subject k, the standing motion of the subject k, the height of the subject k, and the like. During the regression analysis this time, as an example, D was 0.083969, E was 0.087244, F was 0.944432, and G was 62.356075.

Adj R2 of Expression (2) when D was 0.083969, E was 0.087244, and F was 0.944432, and G was 62.356075 was 0.96972. It was determined from the regression analysis that there is an extremely high correlation between the chest angles θ the coordinates a1 to a5 of the shoulder, and the height h. That is, it was determined that it is possible to estimate the chest angles θ in the standing motion using the tracking path L0 of the shoulder of the subject k and the height h of the subject k, with extremely high accuracy.

Hereinafter, the suitability of the estimated value of the chest angle, which is calculated by Expression (1) when A is 0.083953, B is 0.084588y, and C is 62.356075, with respect to the measured value of the chest angle θ while two subjects k having different height perform the standing motion, is verified.

In addition, the suitability of the estimated value of the chest angle, which is calculated by Expression (2) when D is 0.083969, E is 0.087244, F is 0.944432, and G is 62.356075, with respect to the measured value of the chest angle θ while two subjects k having different height perform the standing motion, is verified.

Figure 4:
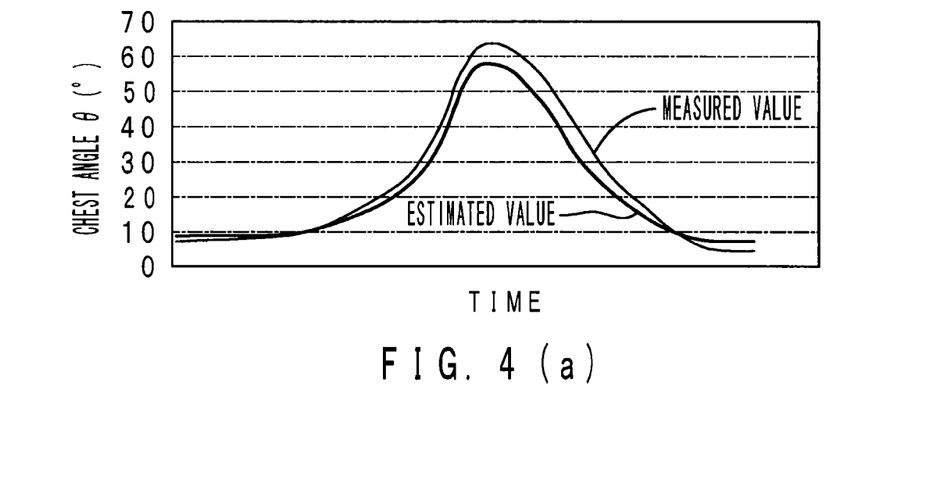
FIG. 4(a) is a graph showing estimated values of chest angles calculated by Expression (1) and measured values of chest angles of a subject having a height of 170 cm during a standing motion.
FIG. 4(b) is a graph showing estimated values of chest angles calculated by Expression (2) and measured values of chest angles of a subject having a height of 170 cm during a standing motion.
Figure 5:
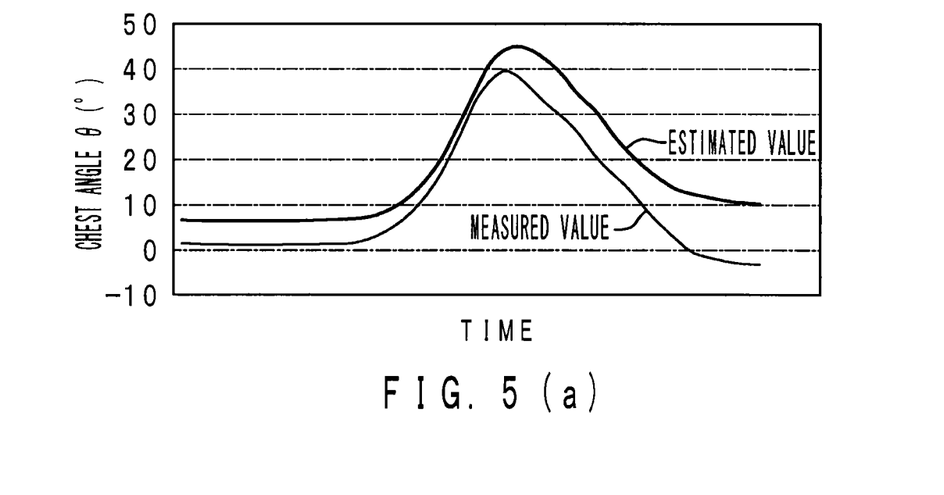
FIG. 5(a) is a graph showing estimated values of chest angles calculated by Expression (1) and measured values of chest angles of a subject having a height of 165 cm during a standing motion.
FIG. 5(b) is a graph showing estimated values of chest angles calculated by Expression (2) and measured values of chest angles of a subject having a height of 165 cm during a standing motion.

FIG. 4(a) shows estimated values of chest angles calculated by Expression (1) and measured values of chest angles of a subject having a height of 170 cm during a standing motion. FIG. 4(b) shows estimated values of chest angles calculated by Expression (2) and measured values of chest angles of a subject having a height of 170 cm during the standing motion. FIG. 5(a) shows estimated values of chest angles calculated by Expression (1) and measured values of chest angles of a subject having a height of 165 cm during a standing motion. FIG. 5(b) shows estimated values of chest angles calculated by Expression (2) and measured values of chest angles of a subject having a height of 165 cm during a standing motion. Each of the horizontal axes of FIGS. 4(a) and 4(b) and 5(a) and 5(b) is the time required for the standing motion.

As shown in FIGS. 4(a) and 5(a), the estimated values obtained by Expression (1) have high suitability with respect to the measured values of the two subjects k having different height. For this reason, the chest angles of the care receiver while performing the standing and sitting motions can be estimated by the coordinates of the shoulder of the care receiver with high accuracy.

As shown in FIGS. 4(b) and 5(b), the estimated values obtained by Expression (2) have extremely high correlation with respect to the measured values of the two subjects k having different height. For this reason, the chest angles of the care receiver while performing the standing and sitting motions can be estimated by the coordinates of the shoulder of the care receiver with extremely high accuracy.

Figure 6:
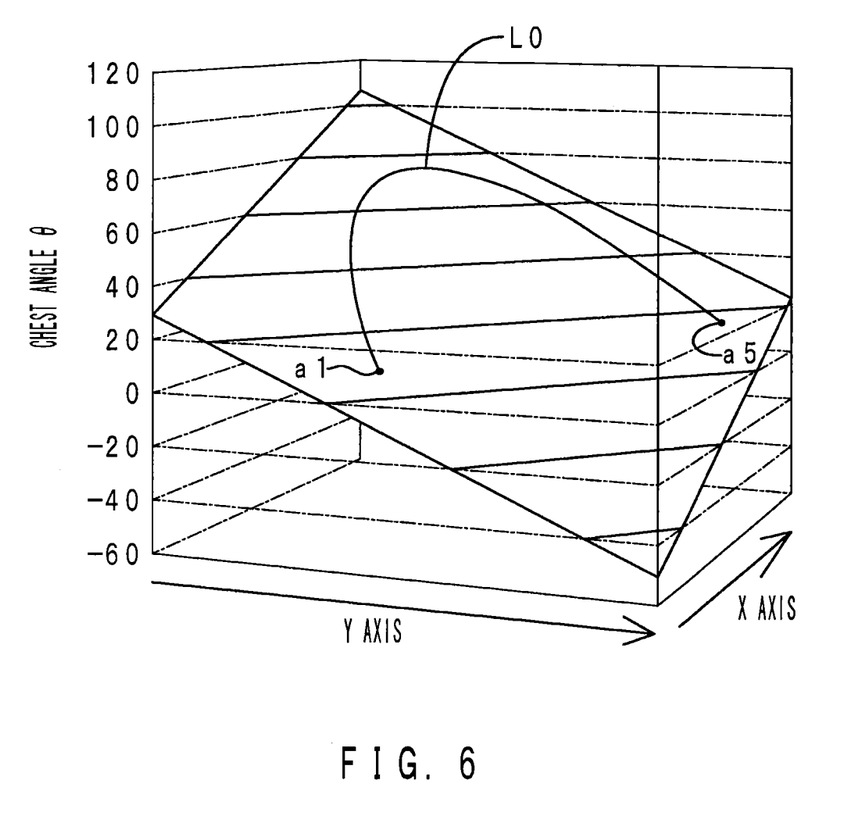
FIG. 6 is a schematic diagram of a chest angle estimation map which is created based on Expression (2).

FIG. 6 schematically shows a chest angle estimation map which is created based on Expression (2). As shown in FIG. 6, in the chest angle estimation map, an arbitrary tracking path L0 of a standing motion draws a C-shaped tracking path from a start point a1 (sitting state) to an end point a5 (standing state).

In the motion setting method to be described later, chest angles in each of the positions of a custom tracking path of a care receiver are estimated using the chest angle estimation map shown in FIG. 6. That is, as will be described later, the custom tracking path is an aggregate of coordinates (x,y) of the shoulder of the care receiver. For this reason, it is possible to calculate the chest angles in each of the positions of the custom tracking path by substituting x and y in each of the positions of the custom tracking path into Expression (2).

<Motion Setting Method>

Figure 7:
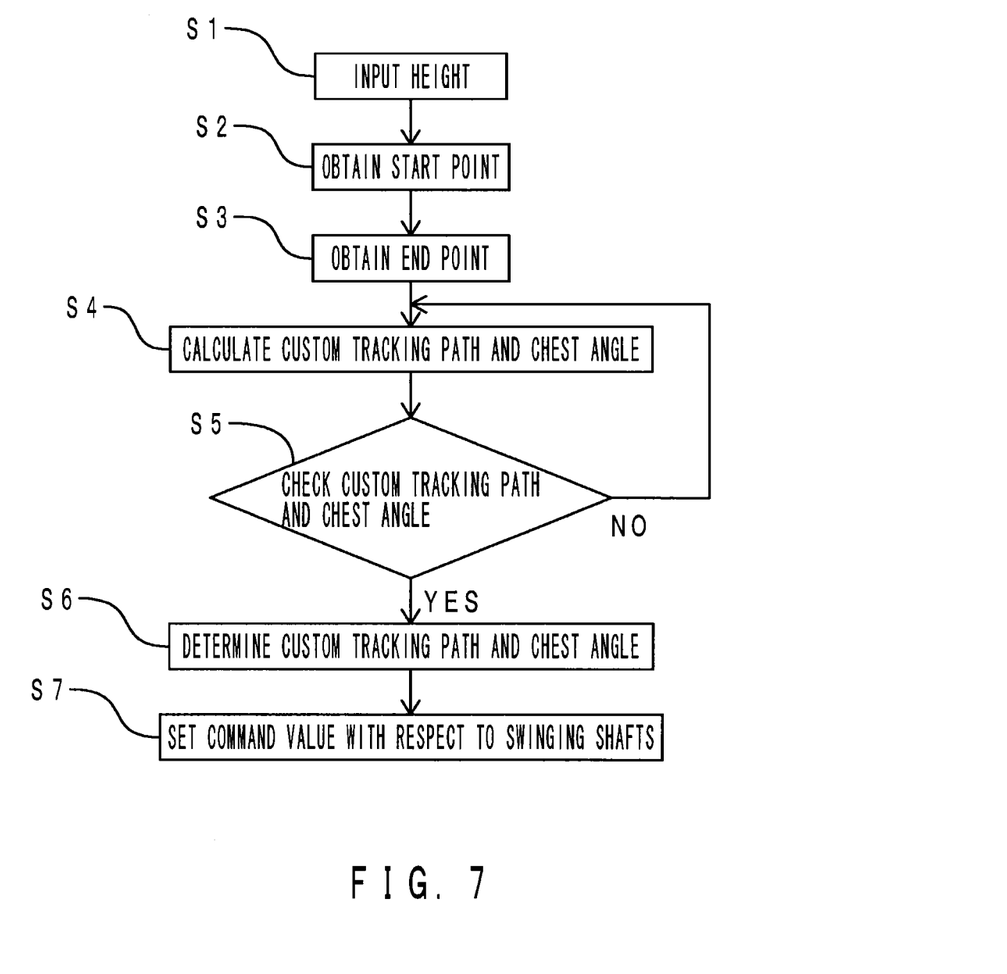
FIG. 7 is a flowchart of a motion setting method as an embodiment of a motion setting method of the present invention.

Next, the motion setting method of the present embodiment will be described. The motion setting method of the present embodiment includes a base tracking path acquisition step and a custom tracking path acquisition step. FIG. 7 is a flowchart of a motion setting method of the present embodiment.

[Base Tracking Path Acquisition Step]

The present step is a step of acquiring a base tracking path of the shoulder. First, as shown in FIGS. 3(a) to 3(e) of the method of estimating the above-described chest angles, the 1315 patterns of the standing motion are sampled through motion capturing. Next, an ideal tracking path L0 is selected among the 1315 tracking paths L0 in order to set the selected tracking path as a base tracking path. The acquired base tracking path is stored in the memory 411 of the computer 41 shown in FIG. 2. The memory 411 also stores the movement speed of the shoulder in each of the positions of the base tracking path.

[Custom Tracking Path Acquisition Step]

In the present step, a custom tracking path is obtained by correcting the base tracking path. First, the operator disposes the robot main body 2 shown in FIG. 1 near the care receiver. Next, after positioning of the robot main body 2, the robot main body 2 is fixed on the floor using four stoppers 201 and a lock mechanism (not shown).

Subsequently, the operator inputs the height of the care receiver to the input device 40 shown in FIG. 2 (S (step) 1 of FIG. 7). Rotation angles of the three servo motors 240 are input to the motion controller 43 from the three encoders 242. CPU 410 obtains a current position of the support portion 23 of the robot main body 2 based on the input rotation angles. In addition, CPU 410 obtains a current position of the shoulder of the care receiver, that is, a start point of the custom tracking path from the current position of the support portion 23 (chest of the care receiver) (S2 of FIG. 7).

Then, CPU 410 obtains an end point of the custom tracking path of the shoulder of the care receiver (S3 of FIG. 7). In specific, the coordinates of the shoulder in the standing state of the care receiver are calculated using the following Expression (3).

End point=Height×Corrected value (%)  Expression (3)

Figure 8A:
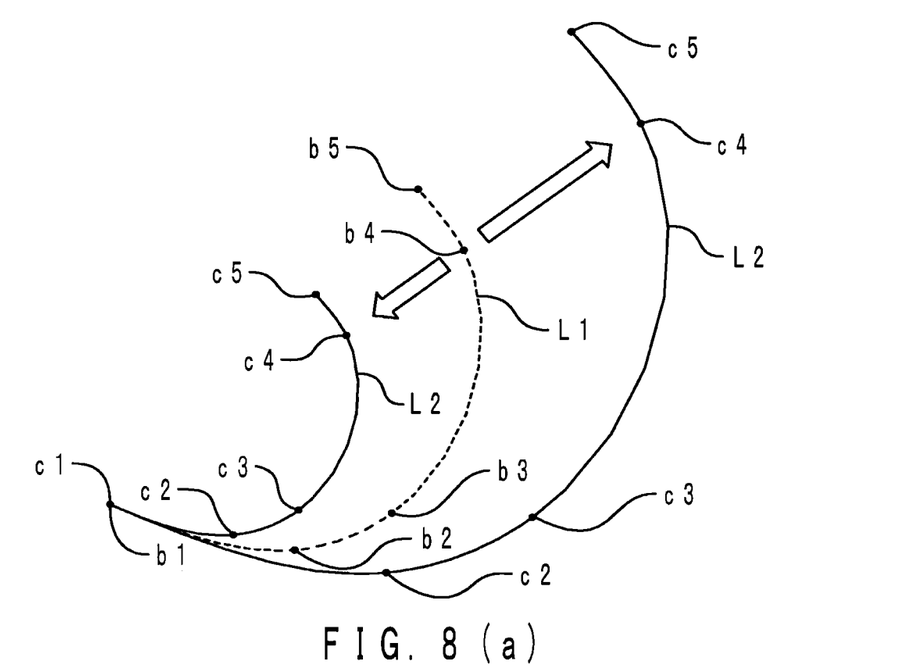
FIG. 8(a) is a schematic diagram when custom tracking paths are calculated by expanding and contracting a base tracking path.
Figure 8B:
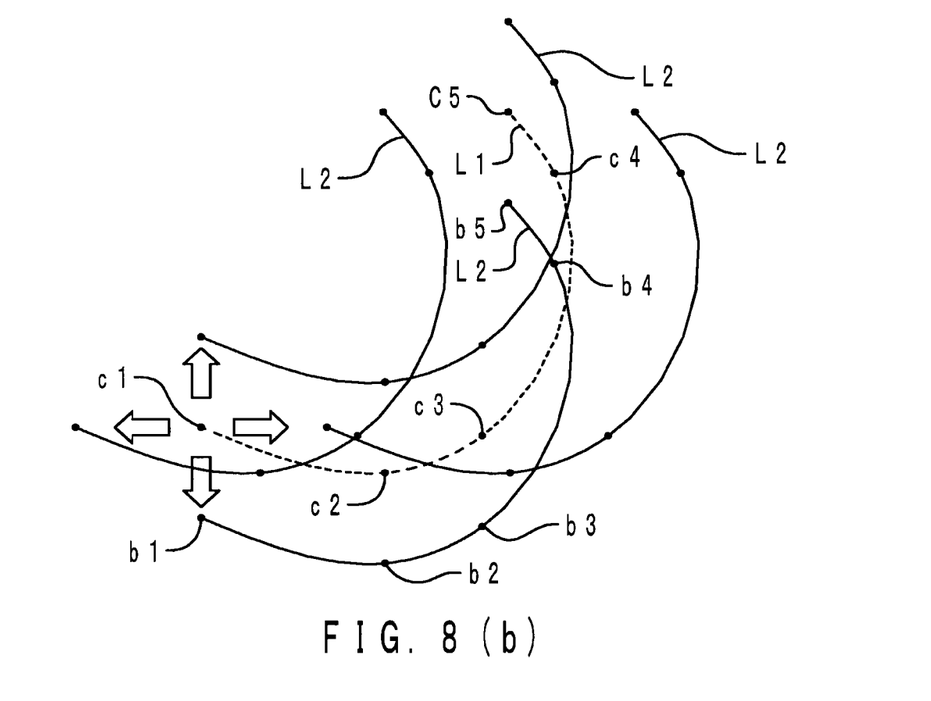
FIG. 8(b) is a schematic diagram when custom tracking paths are calculated by offsetting a base tracking path.

Then, CPU 410 calculates the custom tracking path so as to connect the calculated start point and end point. In addition, CPU 410 calculates the chest angles (S4 of FIG. 7). First, a method of calculating the custom tracking path will be described. In specific, CPU 410 calculates the custom tracking path by correcting the base tracking path in accordance with the height of the care receiver. FIG. 8(a) shows a schematic diagram when custom tracking paths are calculated by expanding and contracting the base tracking path. FIG. 8(b) shows a schematic diagram when the custom tracking paths are calculated by offsetting the base tracking path. In FIGS. 8(a) and 8(b), the coordinates b1 to b5 of the base tracking path L1 correspond to the coordinates c1 to c5 of the custom tracking path L2.

As shown in FIG. 8(a), a long custom tracking path L2 is calculated by expanding the base tracking path L1 when the height of the care receiver is tall. In contrast, a short custom tracking path L2 is calculated by contracting the base tracking path L1 when the height of the care receiver is short. In addition, as shown in FIG. 8(b), the custom tracking paths L2 are calculated by offsetting the base tracking path L1 itself longitudinally and vertically in accordance with the position of the shoulder of the care receiver. As a matter of course, it is possible to calculate the custom tracking paths L2 by appropriately combining the expanding and contracting in FIG. 8(a) and the offsetting in FIG. 8(b).

Next, a method of calculating the chest angles will be described. The chest angle estimation map shown in FIG. 6 is stored in the memory 411 of the computer 41 shown in FIG. 2. CPU 410 calculates chest angles which are ideal for the care receiver from the height of the care receiver and the custom tracking paths L2 through the chest angle estimation map. In specific, the chest angles in each of the positions of the custom tracking paths L2 are calculated by substituting x, y, and the height h of the care receiver in each of the positions of the custom tracking paths L2 into Expression (2).

Subsequently, the CPU 410 checks the calculated custom tracking paths L2 and the chest angles (S5 of FIG. 7). As a result of the checking, custom tracking paths L2 and chest angles which passed the checking are determined (S6 of FIG. 7). In contrast, as a result of the checking, when custom tracking paths L2 and chest angles did not pass the checking (for example, when the height of the care receiver is too tall or too short) S4 and S5 of FIG. 7 are repeated again. The determined custom tracking paths L2 and the chest angles are stored in the memory 411 of the computer 41 shown in FIG. 2.

Once the custom tracking paths L2 and the chest angles are determined, CPU 410 calculates tracking paths of the support portion 23 shown in FIG. 1 so that the shoulder of the care receiver moves along the custom tracking paths L2. In addition, CPU 410 calculates swing angles of the support portion 23 shown in FIG. 1 so that the chest angle of the care receiver is kept in the calculated chest angles. Moreover, command values are set with respect to the swinging shafts 204, 211, and 221 so as to move the robot main body 2 according to the calculated result (S7 of FIG. 7). The command values are stored in the memory 411 of the computer 41 shown in FIG. 2.

In this manner, according to the motion setting method of the present embodiment, it is possible to obtain the chest angles in each of the positions of the custom tracking paths L2, and the custom tracking paths L2 dedicated for a care receiver by simply inputting the height of the care receiver.

<Movement of Standing and Sitting Motion-Supporting Robot>

Figure 9:
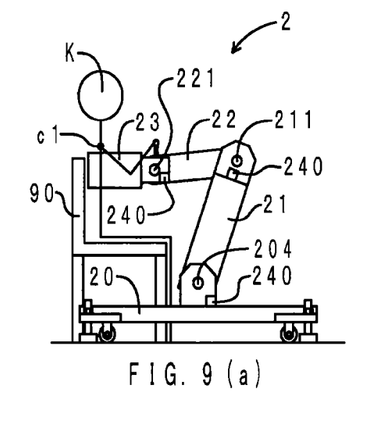
FIG. 9(a) is a schematic diagram of a care receiver in a sitting state and a robot main body.
FIG. 9(b) is a schematic diagram of a care receiver in a first standing state and a robot main body.
FIG. 9(c) is a schematic diagram of a care receiver in a second standing state and a robot main body.
FIG. 9(d) is a schematic diagram of a care receiver in a third standing state and a robot main body.
FIG. 9(e) is a schematic diagram of a care receiver in a standing-upright state and a robot main body.
FIG. 9(f) is a tracking path (custom tracking path) of the shoulder of a care receiver in FIGS. 9(a) to 9(e).

Next, the movement of the standing and sitting motion-supporting robot 1 will be described. FIG. 9(a) shows a schematic diagram of a care receiver in a sitting state and a robot main body. FIG. 9(b) shows a schematic diagram of the care receiver in a first standing state and the robot main body. FIG. 9(c) shows a schematic diagram of the care receiver in a second standing state and the robot main body. FIG. 9(d) shows a schematic diagram of the care receiver in a third standing state and the robot main body. FIG. 9(e) shows a schematic diagram of the care receiver in a standing-upright state and the robot main body. FIG. 9(f) shows a tracking path (custom tracking path) of the shoulder of the care receiver in FIGS. 9(a) to 9(e).

The operator switches the operation mode of the robot main body 2 to an automatic mode using the changeover switch of the manual pulse generator 3 shown in FIG. 2. The computer 41 transmits the command values with respect to the swinging shafts 204, 211, and 221 to the motion controller 43. The motion controller 43 drives the three servo systems 24 according to the command values. That is, as shown in FIGS. 9(a) to 9(f), the three servo motors 240 are driven and the swinging shafts 204, 211, and 221 are rotated so as to keep the coordinates c1 to c5 of the shoulder of the care receiver K (so as to keep the custom tracking path L2 from the start point c1 to the end point c5). As shown in FIG. 2, the rotation angles of the three servo motors 240 are input to the motion controller from the three encoders 242. In this manner, the standing and sitting motion-supporting robot 1 automatically supports the standing motion of the care receiver K.

It is also possible to support the standing motion using a manual mode. In specific, first, the operator switches the operation mode of the robot main body 2 to the manual mode using the changeover switch of the manual pulse generator 3 shown in FIG. 2. Next, the operator rotates the dial. The support portion 23 moves while maintaining the custom tracking paths L2 and the chest angles using the pulse generated in accordance with the rotation angles of the dial. The movement speed and the swing speed of the support portion 23 are manually adjusted by the rotating speed of the dial.

When supporting the sitting motion (motion from FIGS. 9(e) to 9(a)) of the care receiver K in the standing and sitting motion-supporting robot 1, it is necessary to consider the height H of the chair 90 (object used for sitting on) while setting the end point a1 of the custom tracking path L2. In this case, in S1 of FIG. 7, the height of the chair 90 is input through the input device of FIG. 2 in addition to the height of the care receiver K. CPU 410 calculates the end point a1 of the custom tracking path L2 by considering the height H of the chair 90. In specific, in S3 of FIG. 7, the coordinates of the shoulder in the sitting state of the care receiver K are calculated using the following Expression (4) instead of using Expression (3).

End point=Height×Height of chair×Corrected value (%)  Expression (4)

Effect

Next, the effect of the motion setting method of the present embodiment will be described. According to the motion setting method of the present embodiment, it is possible to obtain the custom tracking paths L2 by correcting the base tracking path L1 as shown in FIGS. 8(a) and 8(b). The correction is performed for every care receiver K. For this reason, the movement of a care receiver K tends to fit in the custom tracking paths L2. In addition, the correction is performed in accordance with the position of the shoulder of the care receiver K. For this reason, it is possible to move the standing and sitting motion-supporting robot 1 so as not to interfere with changes in postures of the care receiver K, in other words, to make the care receiver K comfortable.

In addition, according to the motion setting method of the present embodiment, the custom tracking paths L2 are obtained by correcting the base tracking path L1 in accordance with the height of the care receiver K as shown in FIGS. 8(a) and 8(b). For this reason, it is possible to set the custom tracking paths L2 in accordance with the physique of the care receiver K. In addition, according to the motion setting method of the present embodiment, the chest angles of the care receiver K in the custom tracking paths L2 are set in accordance with the height of the care receiver K. For this reason, the care receiver K feels comfortable. In addition, according to the motion setting method of the present embodiment, it is possible to perform the setting of the custom tracking paths L2 and the setting of the chest angles by simply inputting the height of the care receiver K into the input device 40 shown in FIG. 2. For this reason, it is possible to simply set the custom tracking paths L2 and the chest angles in accordance with the physique of the care receiver K.

In addition, according to the motion setting method of the present embodiment, when the base tracking path L1 corresponds to the sitting motion of the care receiver K, the correction, which is performed while obtaining the custom tracking paths L2 from the base tracking path L1, is performed using the height of the care receiver K and the height H of the chair 90, in the custom tracking path acquisition step. For this reason, as shown in FIGS. 9(a) to 9(f), it is possible to set the custom tracking path L2 by adding the height of the chair 90 to the corresponding end point c1 of the custom tracking path L2.

In addition, according to the motion setting method of the present embodiment, as shown in FIGS. 8(a) and 8(b), in the custom tracking path acquisition step, the correction, which is performed while obtaining the custom tracking paths L2 from the base tracking path L1, includes at least one of the expanding, the contracting, and the offsetting of the base tracking path L1. For this reason, it is possible to simply calculate the custom tracking paths L2 from the base tracking path L1.

In addition, as shown in FIGS. 3(a) to 3(f), the base tracking path L1 and the chest angle estimation map (refer to FIG. 6) are obtained through motion capturing. For this reason, it is possible to simply obtain the base tracking path L1 and the chest angle estimation map.

In addition, as shown in FIGS. 3(a) to 3(f), the base tracking path L1 is obtained by sampling the standing and sitting motions of a subject k (healthy person). For this reason, it is possible to obtain not only the base tracking path L1 but also the custom tracking paths L2 without making the care receiver K, who already has difficulty in performing standing and sitting motions, perform the standing and sitting motions.

In addition, according to the robot main body 2 of the standing and sitting motion-supporting robot 1 of the present embodiment, as shown in FIG. 1, the first arms 21, the second arm 22, and the support portion 23 can respectively move with respect to the base 20, the first arms 21, and the second arm 22. That is, the robot main body 2 includes three swinging shafts 204, 211, and 221. For this reason, the degree of freedom of the setting of the custom tracking paths L2 of the support portion 23 becomes high.

In addition, according to the standing and sitting motion-supporting robot 1 of the present embodiment, the base main body 200 of the base 20 shows a C frame shape which opens frontward (to the side of the care receiver K). That is, the anterior part of the base main body 200 forms a recess portion which opens frontward. For this reason, as shown in FIGS. 9(a) to 9(e), the care receiver K can perform the standing and sitting motions in a state of inserting his or her feet into the C frame of the base main body 200. Accordingly, it is possible to shorten the back and forth length of the robot main body 2 in comparison with the case where the care receiver K needs to place his or her feet ahead of the base main body 200. In addition, it is possible to shorten the length (length of the swinging of the first arms 21, second arm 22, and support portion 23) of the custom tracking paths L2 of the support portion 23.

In addition, the robot main body 2 of the standing and sitting motion-supporting robot 1 of the present embodiment includes four proximity sensors 203 at the four corners as shown in FIG. 1. For this reason, the computer can make the robot main body 2 stop in an emergency when the proximity sensors 203 detect any obstacles that can interfere with the motion of the robot main body 2 while supporting the standing and sitting motions of the care receiver K.

<Others>

Hereinabove, the embodiment of the motion setting method of the present disclosure was described. However, the embodiment is not particularly limited to the above-described mode. It is also possible to implement various modified modes and improved modes that those skilled in the art could implement.

In the above-described embodiment, as shown in FIGS. 3(a) to 3(f), the tracking path L0 of the shoulder of the subject k was obtained by approximating the coordinates a1 (x,y) to a5 (x,y) of the shoulder in each posture of the standing motion using the least square method. However, the tracking path L0 of the shoulder of the subject k may also be obtained by connecting the coordinates a1 (x,y) to a5 (x,y) of the shoulder with a line.

In the above-described embodiment, an ideal tracking path L0 is selected among the 1315 tracking paths L0 in order to set the tracking path as a base tracking path L1. However, the base tracking path L1 may also be obtained by approximating the coordinate group which becomes a base of the 1315 tracking paths L0 using the least square method.

In the above-described embodiment, as shown in FIGS. 3(a) to 3(f), the base tracking path L1 and the chest angle estimation map were obtained using motion capturing. However, the base tracking path L1 and the chest angle estimation map may also be obtained through other methods (for example, a method using a gyro sensor).

In addition, if there is no problem in the exercising ability of the care receiver K, the movement of the care receiver K oneself may be sampled and stored in the memory 411. Then, the base tracking path L1 may be obtained based on the movement. In addition, the base tracking path L1 itself may be set as the custom tracking path L2 while obtaining the custom tracking path L2. In addition, the custom tracking path L2 may be set by correcting the base tracking path L1 to a certain degree. The movement of the robot main body 2 may also be a movement based on not only the base tracking path L1 but also the custom tracking path L2. It is possible to omit S1 to S5 in the flowchart of FIG. 7 when the base tracking path L1 itself which is obtained based on the movement of the care receiver K himself or herself is set as the custom tracking path L2.

In the above-described embodiment, a three-shaft type robot main body 2 which has three swinging shafts 204, 211 (where a pair of right and left shafts is provided), and 221 was used. However, the number of arrangements of the swinging shafts 204, 211, and 221 is not particularly limited. A two-shaft type or four-shaft type robot main body may be used. In addition, a robot main body where the swing mechanism and the sliding mechanism (for example, the mechanism in which the first arms 21 slide front-rear direction with respect to the base 20) are used in combination may be used.

The timing of executing the manual mode is not particularly limited. Every custom tracking path L2 may be performed with the manual mode. In addition, the manual mode may intervene during the automatic mode while checking the state of the care receiver K.

The type of the proximity sensor 203 is not particularly limited. The sensor may be a high frequency oscillation type proximity sensor, a magnetic type proximity sensor, an electrostatic capacitance type proximity sensor, CCD (charge-coupled device) image sensor, CMOS (complementary metal-oxide semiconductor) image sensor, or the like. The arrangement place or the number of arrangements of the proximity sensors 203 is also not particularly limited.

The body portion of the care receiver K which the support portion 23 supports is not limited to the chest. The portion may be the abdomen, the neck, the head, the shoulder, the waist, and the like. In addition, a plurality of portions of the body may be supported by the support portion 23. Similarly, the body portion for which the base tracking path L1 and the custom tracking paths L2 are set is not limited to the shoulder. The portion may be the chest, the abdomen, the neck, the head, the waist, and the like. In addition, the object on which the care receiver K sits is not limited to the chair 90. The object may be a bedside, a toilet seat, and the like. In addition, the fixed numbers A, B, and C of Expression (1) and the fixed numbers D, E, F, and G of Expression (2) are not particularly limited. The fixed numbers may be positive numbers (positive real numbers) obtained as a result of the regression analysis.

The invention claimed is:

1. A motion setting method of a standing and sitting motion-supporting robot that supports standing and sitting motions being at least one of a standing motion and a sitting motion of a care receiver, the method comprising:
   storing in a memory of the robot a predetermined base tracking path of the standing and sitting motions, the predetermined base tracking path being a single ideal tracking path selected from multiple predetermined patterns;
   storing in the memory of the robot a chest angle estimation map;
   inputting a height of the care receiver into an input device of the robot;

obtaining a custom tracking path by correcting the predetermined base tracking path of the standing and sitting motions of the robot in accordance with the height of the care receiver and a position of a predetermined body portion of the care receiver, the position of the predetermined body portion being a start point of the custom tracking path that is determined by a position of a support portion of the robot that supports the care receiver;

determining ideal chest angles at a plurality of positions along the custom tracking path from the chest angle estimation map based on the height of the care receiver; and moving the support portion of the robot to the ideal chest angles in accordance with moving the robot along the custom tracking path.

2. The motion setting method according to claim 1, wherein the correcting includes at least one of expanding, contracting, and offsetting of the predetermined base tracking path.

3. The motion setting method according to claim 2, wherein the multiple predetermined patterns are obtained through motion capturing.

4. The motion setting method according to claim 3, wherein the predetermined body portion is at least one of the head, the shoulder, the chest, and the legs of the care receiver.

5. The motion setting method according to claim 2, wherein the predetermined body portion is at least one of the head, the shoulder, the chest, and the legs of the care receiver.

6. The motion setting method according to claim 1, wherein the multiple predetermined patterns are obtained through motion capturing.

7. The motion setting method according to claim 6, wherein the predetermined body portion is at least one of the head, the shoulder, the chest, and the legs of the care receiver.

8. The motion setting method according to claim 1, wherein the predetermined body portion is at least one of the head, the shoulder, the chest, and the legs of the care receiver.

9. The motion setting method according to claim 1, wherein the predetermined base tracking path is a predetermined path of a shoulder during the standing and sitting motions.

* * * * *